2,962,510

$\Delta^{1,4,6}$-PREGNATRIENE-17α-OL-3,20-DIONE ESTERS

Wolfgang Hiersemann, Berlin-Halensee, Emanuel Kaspar, Berlin-Wilmersdorf, and Ulrich Kerb, Berlin-Charlottenburg, Germany, assignors to Firma Schering A.G., Berlin, Germany No Drawing. Filed Dec. 9, 1958, Ser. No. 779,048
Claims priority, application Germany Dec. 18, 1957
4 Claims. (Cl. 260—397.4)

This application relates to new steroid derivatives, and more particularly to derivatives of esters of 17α-hydroxyprogesterone.

While esters of 17α-hydroxyprogesterone have a greater progestative action as well as prolonged activity as compared to progesterone, particularly upon peroral administration, considerable investigation has been and is still being carried out to further increase the progestative action, i.e. to find new derivatives with still greater activity.

It has been discovered that the valuable properties of 17α-hydroxyprogesterone esters can be improved by introducing an additional double bond into the 1-position of the ester. This results in increasing the strength of the action of the compound.

It has furthermore been surprisingly discovered according to the present invention that the valuable properties can be still further increased by introducing a second double bond into the molecule, this second double bond being in the 6-position. Thus, while esters of $\Delta^{1,4}$-pregnadiene-17α-ol-3,20-dione have increased activity as compared to the corresponding ester of 17α-hydroxyprogesterone, it has been discovered that the $\Delta^{1,4,6}$-pregnatriene-17α-ol-3,20-dione esters have still further increased properties.

It is accordingly the primary object of the present invention to provide the new steroid derivatives of the present invention which have improved progestative activity as compared to 17α-hydroxyprogesterone and esters thereof.

It is still another object of the present invention to provide for the production of the new steroid derivatives of the present invention.

Other objects and advantages of the present invention will be apparent from a further reading of the specification and of the appended claims.

With the above objects in view, the present invention mainly comprises as new compounds, esters of $\Delta^{1,4,6}$-pregnatriene-17α-ol-3,20-dione. Esters of carboxylic acids of 1–7 carbon atoms, and particularly of straight chain aliphatic carboxylic acids of 1–7 carbon atoms are most preferred in accordance with the present invention.

The method of the present invention mainly comprises the introduction of a carbon-carbon double bond into the 1-position and another carbon-carbon double bond into the 6-position of esters of 17α-hydroxyprogesterone. In accordance with another embodiment of the present invention the two carbon-carbon double bonds are directly introduced into 17α-hydroxyprogesterone and the resulting $\Delta^{1,4,6}$-pregnatriene-17α-ol-3,20-dione is then esterified, preferably with an aliphatic carboxylic acid of 1–7 carbon atoms.

The advantages of the present invention will be apparent from the following example. While progesterone and 17α-hydroxyprogesterone upon peroral administration have practically no progestative activity, the esterification of 17α-hydroxyprogesterone does result in a compound with progestative activity. Thus, 17α-hydroxyprogesterone-acetate is found upon a single application to determine a positive result in the Clauberg test to require a minimum amount of 7 mg. In the case of $\Delta^{1,4}$-pregnadiene-17α-ol-3,20-dione-acetate this amount is reduced to 0.6 mg., and in the case of the $\Delta^{1,4,6}$-pregnatriene-17α-ol-3,20-dione-acetate the amount necessary is further reduced to 0.3 mg.

The increase in activity with homologues of $\Delta^{1,4,6}$-pregnatriene-17α-ol-3,20-dione-esters of aliphatic carboxylic acids of preferably 1–7 carbon atoms is entirely analogous. The new valuable esters of $\Delta^{1,4,6}$-pregnatriene-17α-ol-3,20-dione can be produced according to methods known in steroid chemistry, particularly by brominating the corresponding 17α-hydroxyprogesterone ester with two mols of bromine and subsequently splitting off of two mols of hydrogen bromide. The bromination is preferably carried out in absolute dioxane utilizing bromine which has been previously distilled over phosphorus pentoxide, at room temperature. A bromination is advantageously carried out under reduced pressure, for example, about 300 mm. Hg, in a stream of nitrogen to promote the removal of the formed hydrogen bromide. The subsequent splitting off of the hydrogen bromide from the formed dibromide compound is preferably carried out by cooking the crude brominated product with a tertiary base, preferably collidine.

The following examples are given to further illustrate the present invention. The scope of the invention is not, however, meant to be limited to the specific details of the examples.

Example 1

12.5 g. of 17α-hydroxyprogesterone-17-acetate are suspended in 400 cc. of absolute dioxane. 3.7 cc. of bromine previously distilled over phosphorus pentoxide are added at room temperature under stirring and while conducting a dry nitrogen stream therein. The reaction mixture is stirred for ¾ hour at this temperature under a pressure of 300 mm. Hg and while passing a mild stream of nitrogen therethrough. The reaction mixture is then introduced dropwise into ice water while stirring, the thus formed precipitate is filtered off by suction, washed until neutral, and dried under vacuum at —9° C. There is thus obtained a 17.8 g. of 2,6-dibromo-17α-hydroxyprogesterone-17-acetate having a melting point of 138° C. (with decomposition). The decomposition melting point is determined according to the method of Böhme, Deutsche Apothekerzeitung 95, 153 (1955).

Recrystallization from 1:1 methylene chloride/methanol results in increase of the melting point to 142° C. (with decomposition). The dibromide absorbs in ultraviolet at 250 mμ with an extinction at 12300.

14.2 g. of the crude dibromide compound are cooked under refluxing while stirring in a nitrogen atmosphere for 5 hours with 500 cc. of freshly distilled collidine. After cooling a mixture of dilute hydrochloric acid and ice (approximately 2 N are added dropwise under stirring to the reaction mixture. The reaction mixture is then extracted with ether, subsequently washed first with 2 N hydrochloric acid and then with water until neutral, dried, and then the ether is distilled off under vacuum at 30° C. The remaining yellow-brown foamy residue (8.7 g.) is taken up in 1:1 carbon tetrachloride/methylene chloride, and eluated with 1:2 carbon tetrachloride/ methylene chloride over 450 g. of aluminum oxide (Woelm, acid). After recrystallization, the resulting substance is the weakly straw-yellow 17α-hydroxy-$\Delta^{1,4,6}$-pregnatriene-3,20-dione-17-acetate having a melting point of 192–192.5° C. The triene absorbs in ultraviolet at the following wave lengths (in methanol) with the extinctions set forth below:

$E_{221}=11,025$
$E_{259}= 9,790$
$E_{296}=12,830$

Example 2

12.5 g. of 17α-hydroxyprogesterone-17-caproate are brominated as described in Example 1.

Two fractions are obtained by crystallization of the crude product (16.5 g.) from methylenechloride/methanol:

2.678 g. 2,6β-dibromo-17α-hydroxyprogesterone-17α-caproate melting point=113/114–116° C. (with decomposition).

Ultraviolet absorption at $E_{250}=12,340$ (methanol).

3.13 g. 2,6α-dibromo-17α-hydroxyprogesterone-17α-caproate melting point=165–166° C. (with decomposition).

Ultraviolet absorption at $E_{240}=12,100$.

The 6β-bromide moves the ultraviolet spectrum 10 mμ into the longer wave length while the 6α-bromide is without influence on the absorption of Δ⁴-3-keto-compounds. (C. Djerassi et al., Am. Soc. 72, 4534 (1959).)

6.9 g. of the above dibromide compound is introduced into 1.4 liters of ice-cooled 2 N hydrofluoric acid under stirring. It is subsequently extracted with ether, washed with water until neutral, dried, and the solvent is distilled off. The yellowish-brown residue (4.6 g.) is extracted with 1:1 carbon tetrachloride/methylene chloride and eluated over 600 g. of aluminum oxide (Woelm, approximately neutral, 1% $H_2O$) with 1:2 carbon tetrachloride/methylene chloride.

After recrystallization from ether/pentane, the colorless 17α - hydroxy - $\Delta^{1,4,6}$-pregnatriene-3,20-dione-17-caproate having a melting point of 100/101-103° C. (4°/min.) is obtained.

The trienone exhibits the following ultraviolet absorptions:

$E_{208}=14,150$   $E_{255}= 9,870$
$E_{220}=12,700$   $E_{300}=12,320$
(methanol)

The splitting off of hydrogen bromide from the dibromide, melting point equal 165–166° C., results in the formation of the $\Delta^{1,4,6}$-3-keto-system. Both reaction products have the same melting point, analysis, ultra-violet and infra-red spectrums.

Example 3

1 g. of 17α-hydroxyprogesterone and 3 g. of chloranil are cooked under refluxing in 150 cc. of n-amyl alcohol for 4 hours while passing a stream of nitrogen therethrough (compare Agnello and Laubach, Journ. Amer. Chem. Soc., vol. 72, page 1257 (1957)).

The amyl alcohol is distilled off under vacuum, the residue taken up in methylene chloride, and the solution washed three times with weak alkaline sodium dithionite solution, two times with n/10 sodium hydroxide and subsequently with water until neutral. After drying and distilling off of the solvent the brown residue is dissolved in methanol, cooked with activated carbon, subjected to suction filtration, and concentrated. There is thus obtained 0.4053 g. of crude 17α-hydroxy-$\Delta^{1,4,6}$-pregnatriene-3,20-dione having a melting point of 220–237° C. After several recrystallizations from methanol, the melting point is increased to 237/241.5–243° C. (4°/min.).

$(\alpha)_D=+37.7°$ (dioxane).

The pure trienone has the following ultraviolet spectrum in methanol:

$E_{203}=12,680$   $E_{257}= 9,720$
$E_{221}=11,990$   $E_{300}=12,940$ 0.328 g. of $\Delta^{1,6}$-17α-hydroxyprogesterone, 0.172 g. of p-toluene-sulfonic acid and 15 cc. of acetanhydride are stirred for 1½ hours under the introduction of nitrogen at room temperature.

For further working up, the reaction mixture is poured into 200 cc. of ice water and 10 cc. of pyridine, extracted with methylene chloride, the organic phase washed until neutral with water, dried, and the solvent evaporated. The yellow oily residue is chromatographically extracted on aluminum oxide (Woelm, acid, 1% $H_2O$). The $\Delta^{1,6}$-17α-hydroxyprogesterone-17-acetate is eluated with 2:1 methylene chloride/carbon tetrachloride, and then recrystallized from methanol.

Melting point: 197–198° C. $(\alpha)_D: +31.4°$ $(CHCl_3)$.

Example 4

1 g. of 17α-hydroxy progesterone-formate and 3.5 g. of chloranil are cooked in 300 cc. of n-amyl alcohol for 4 hours under refluxing while introducing nitrogen therein.

The amyl alcohol is distilled off under vacuum, the residue dissolved in methylene chloride and the solution washed with weak alkaline sodium dithionite solution with n/10 sodium hydroxide and subsequently with water until neutral. After distilling off the solvent, the residue is dissolved in 1:1 methylene chloride/carbon tetrachloride and extracted on a column of aluminum oxide (Woelm, neutral, 1% $H_2O$). The $\Delta^{1,6}$-17α-hydroxyprogesterone-17-formate is eluated with 2:1 methylene chloride/carbon tetrachloride.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 17 - esters of $\Delta^{1,4,6}$ - pregnatriene-17α-ol-3,20-dione with aliphatic carboxylic acids of 1–7 carbon atoms.
2. 17α - hydroxy-$\Delta^{1,4,6}$-pregnatriene-3,20-dione-17-acetate.
3. 17α - hydroxy-$\Delta^{1,4,6}$-pregnatriene-3,20-dione-17-caproate.
4. $\Delta^{1,6}$-17α-hydroxy-progesterone-17-formate.

References Cited in the file of this patent

UNITED STATES PATENTS

| | | |
|---|---|---|
| 2,705,237 | Djerassi et al. | Mar. 29, 1955 |
| 2,814,631 | Gould | Nov. 26, 1957 |